United States Patent [19]

Lutz

[11] Patent Number: 5,584,503
[45] Date of Patent: Dec. 17, 1996

[54] VEHICLE STEERING WHEEL WITH AN INTEGRATED GAS BAG MODULE

[75] Inventor: Joachim Lutz, Schechingen, Germany

[73] Assignee: TRW Repa GmbH, Alfdorf, Germany

[21] Appl. No.: 508,670

[22] Filed: Jul. 28, 1995

[30] Foreign Application Priority Data

Aug. 18, 1994 [DE] Germany .................. 44 29 214.7

[51] Int. Cl.⁶ .................................................. B60R 21/16
[52] U.S. Cl. .......................................................... 280/731
[58] Field of Search .................... 280/728.1, 728.2, 280/731, 741

[56] References Cited

U.S. PATENT DOCUMENTS

| | | | |
|---|---|---|---|
| 3,827,715 | 8/1974 | Lynch . | |
| 4,325,568 | 4/1982 | Clark et al. | 280/731 |
| 4,836,795 | 6/1989 | Schauer | 280/731 |
| 5,383,682 | 1/1995 | Nagata et al. | 280/731 |
| 5,419,585 | 5/1995 | Breed et al. | 280/728.2 |
| 5,470,099 | 11/1995 | Williams | 280/731 |

FOREIGN PATENT DOCUMENTS 2242871  10/1991  United Kingdom .................. 280/731

*Primary Examiner*—Paul N. Dickson
*Attorney, Agent, or Firm*—Tarolli, Sundheim, Covell, Tummino & Szabo

[57] ABSTRACT

The vehicle steering wheel with integrated gas bag restraining system is composed of two steering wheel parts, a first steering wheel part (10) comprising the steering wheel rim with sheathing as well as spokes and a fastener flange, and a second part (20) forming the hub part (22) and with a bush (26) for securing to the end of the steering shaft (28). Within the steering wheel a gas bag module (30) is accommodated. The cover (12a) of this gas bag module (30) is integrated in the sheathing (12) of the steering wheel.

8 Claims, 3 Drawing Sheets

VEHICLE STEERING WHEEL WITH AN INTEGRATED GAS BAG MODULE

BACKGROUND OF THE INVENTION

The invention relates to a vehicle steering wheel with an integrated gas bag module.

A vehicle steering wheel consists typically of a metallic steering wheel body, also termed steering wheel skeleton, and a sheathing surrounding the steering wheel body fully or partially. To the central part of the steering wheel body a steering wheel rim is connected via several, usually three, spokes. The hub part is provided with an axial thru-hole for the end of the steering shaft. Fastening to the steering shaft is done by means of a threaded nut screwed on the end of the shaft. After fastening the vehicle steering wheel to the steering shaft a complete gas bag module having a folded gas bag and a gas generator is inserted in the hollow hub part. As a final step, a cover is then placed over the gas bag module.

SUMMARY OF THE INVENTION

The present invention provides a vehicle steering wheel with an integrated gas bag module, the manufacture and installation of which is substantially simplified. In the vehicle steering wheel according to the invention the steering wheel body is made up of two interconnected parts, of which the first is substantially formed by the hub part and the second substantially by the steering wheel rim and sheathing and with integrated cover therein as well as spokes and a fastener flange for the hub part. In this configuration of the vehicle steering wheel there is no need to manufacture and install a cover separately. Rather, the vehicle steering wheel with integrated gas bag restraining system is furnished as a ready-to-fit module. The fastening at the end of the steering shaft is achieved in the preferred embodiment by means of an internally splined bush on the hub part which fits on the suitably externally splined end of the steering shaft, the hub part being defined axially on the steering shaft by a locking washer which engages a peripheral groove on the free end of the steering shaft protruding into the hub part.

In addition, the preferred embodiment of the gas bag module is provided with a mounting flange which is clamped between two opposed flanges of the two steering wheel parts, these flanges being held together by nuts and bolts.

BRIEF DESCRIPTION OF THE DRAWINGS

Further advantages and features of the invention will now be evident from the following description of a preferred embodiment and the drawing to which reference is made and in which.

DESCRIPTION OF PREFERRED EMBODIMENTS

Figure 1:
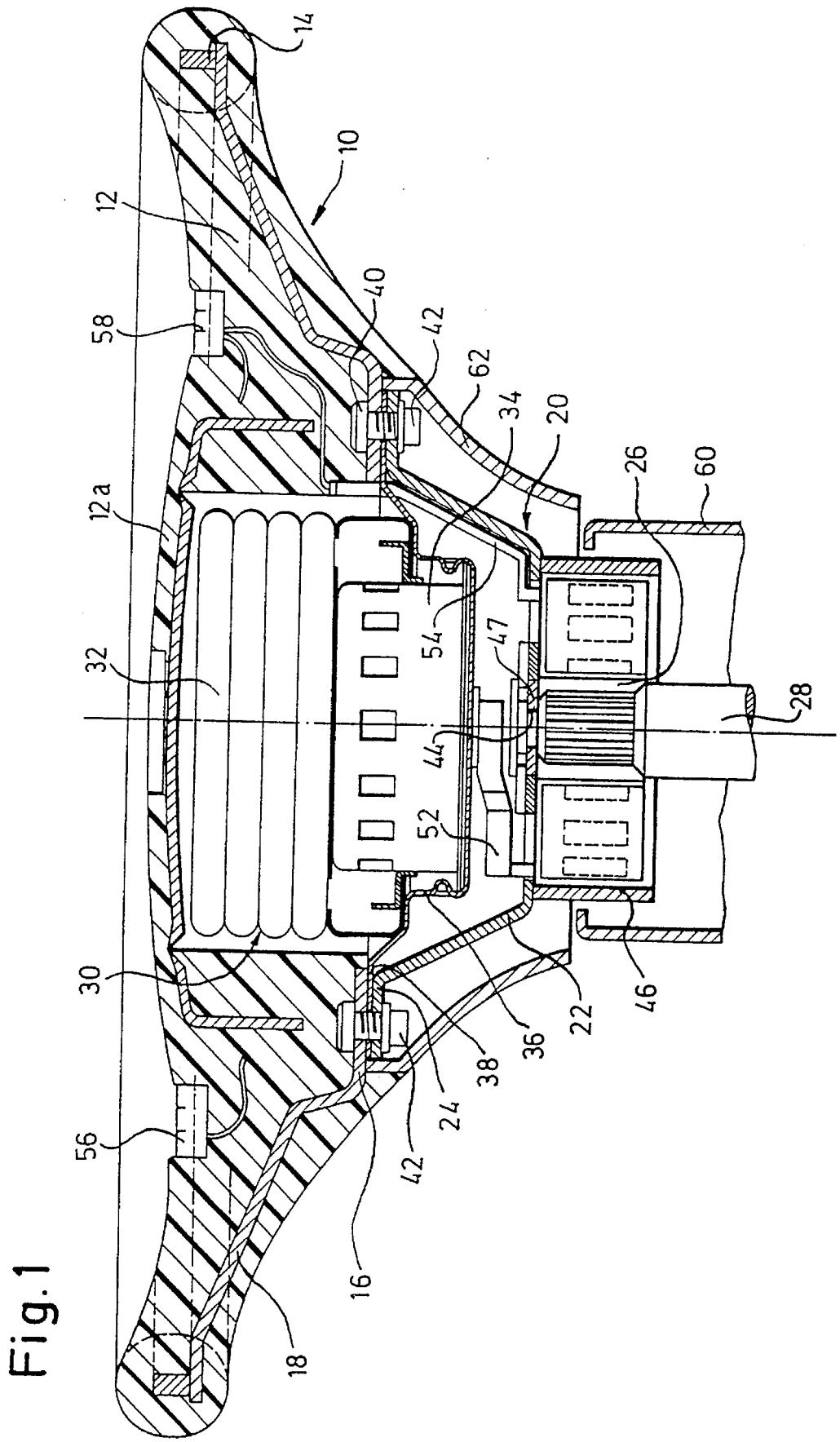
FIG. 1 is a schematic section view of the steering wheel with integrated gas bag module.
Figure 2:
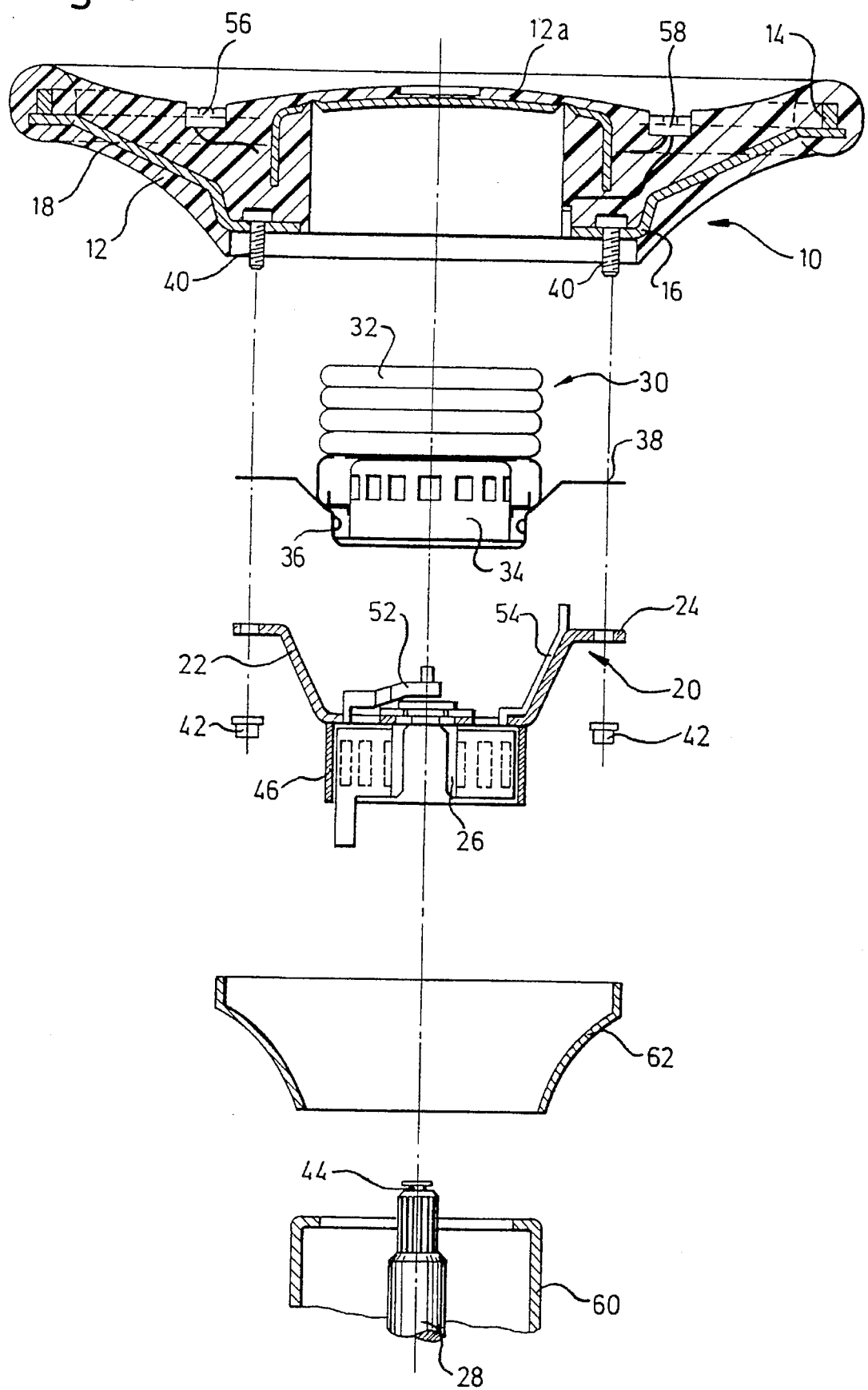
FIG. 2 is an exploded view of this steering wheel.

The steering wheel shown in the FIGS. 1 and 2 is composed of two steering wheel parts, an upper steering wheel part 10, comprising a sheathing 12, a steering wheel rim 14, a radial fastener flange 16 as well as spokes 18, and a lower steering wheel part 20 consisting of a hub part 22 having an also radial fastener flange 24 and a cylindrical bush 26 for securing to the end of a steering shaft 28. In the sheathing 12 a cover 12a for a gas bag module 30 is integrated, which is accommodated within the steering wheel between this cover 12a and the bottom of the hub part 22. The gas bag module 30 consists of a folded gas bag 32 and a gas generator 34 which is seated in a generally cup-shaped hub part 36 which in turn is provided with a mounting flange 38 oriented radially outwards. This mounting flange 38 is clamped between the fastener flanges 16 and 24 of the two steering wheel parts 10, 20.

Securing the two steering wheel parts 10, 20 to each other is done by means of pillar bolts 40 which extend through the fastener flange 16 and pass through corresponding openings in the mounting flange 38 and in the fastener flange 24, as well as by means of nuts 42 screwed on the ends of the pillar bolts 40.

The end of the steering shaft 28 with its tapered diameter is provided with an external spline which positively interlocks with an internal spline of the bush 26. At its end neighboring the hub part 22 this bush has a thru-opening for the tapered free end of the steering wheel shaft 28 which protrudes into the internal space of the hub part 22 and which features a peripheral groove 44. Into this peripheral groove 44 a locking part 47 is inserted transversely to the centerline of the steering shaft 28 to lock the hub part 22 axially in place at the end of the steering shaft 28.

Figure 3:
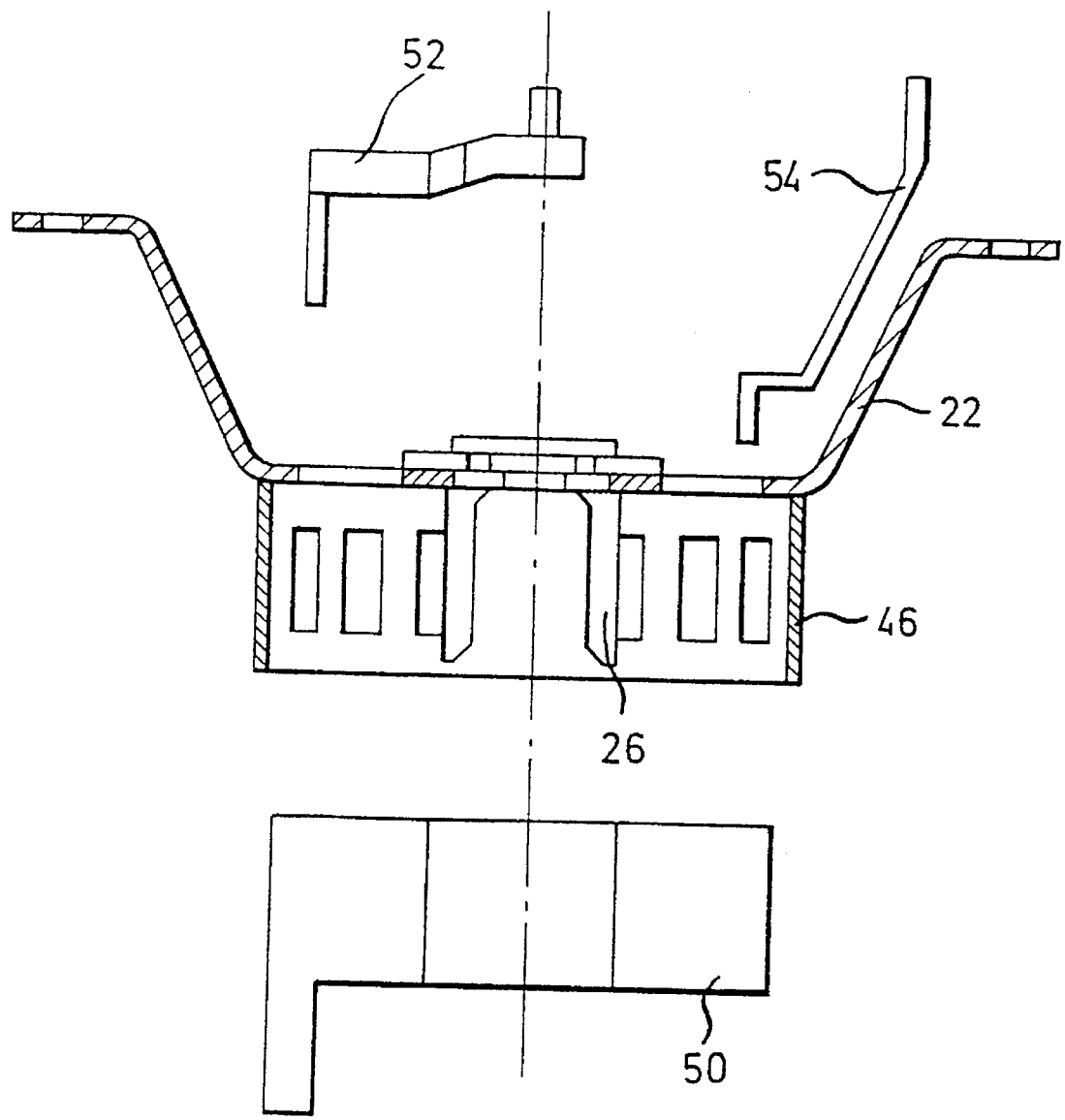
FIG. 3 is a detail view of the steering wheel.

The bush 26 is surrounded radially spaced by a cylindrical apron 46 which is fixedly connected to the hub part 22 and forms together with the bush 26 an annular space for receiving at least one helically-wound contact spring 50. This contact spring 50 shown schematically in FIG. 3 is connected by its internal end to connecting parts 52, 54 which are provided with plug-in connections and of which the connecting part 52 makes the connection to the gas generator 34 whilst connecting part 54 serves to connect the electric switches 56, 58 which are integrated in the sheathing 12 of the steering wheel. The outer end of the contact spring 50 is fixedly defined with respect to the steering column 60 surrounding the steering shaft 28 and makes the connection to circuits inside the vehicle. In conclusion, over the apron 46 and the hub part 22 a generally bell-shaped connecting part 62 is placed which continues the outer profile of the sheathing 12 of the steering wheel in the direction of the steering column 60.

The vehicle steering wheel according to the invention with integrated gas bag restraining system features numerous advantages as compared to conventional designs. Since the cover 12a is integrated in the sheathing 12 there are no undesirable parting profiles or departures in color. The modular configuration of the steering wheel made up of two interconnected steering wheel parts and a prefabricated gas bag module proves to be particularly expedient, because the manufacture of each component permits individual optimization. Due to embodying the connecting parts 52, 54 with plug-in connector elements the contact connections may be made simply by joining together in the axial direction when the steering wheel is assembled. The major advantage results for the car maker who receives a finished steering wheel in which the gas bag restraining system is already incorporated, which permits installation in the vehicle with minimum effort. The compact configuration of the steering wheel results further in savings in the overall height axially. Since, in conclusion, the components of the steering wheel may be easily separated from each other, recyling is also facilitated.

What is claimed is:

1. A vehicle steering wheel with an integrated gas bag module, said steering wheel comprising a steering wheel body and a hub, said steering wheel body comprising an outer steering wheel rim, an inner annular flange, and a plurality of spokes interconnecting said annular flange and said steering wheel rim, said hub securing said steering wheel to a steering shaft, said hub having an outer rim connected to said annular flange by fastening means, said gas bag module comprising a folded gas bag, a gas generator and a cover, said steering wheel rim and at least part of said spokes being encased in a continuous sheathing of plastics material, said gas bag module cover forming an integral part of said sheathing, said gas bag and said gas generator being accommodated in a space defined between said cover and a bottom portion of said hub, said steering wheel forming a preassembled unit which can be mounted to said steering shaft.

2. The vehicle steering wheel as set forth in claim 1, wherein said fastening means are formed by a plurality of bolts passing through aligned openings in said annular flange and said hub outer rim.

3. The vehicle steering wheel as set forth in claim 1 wherein said hub has an internally splined bush fitting on an externally splined end of said steering shaft, said steering shaft having a free end provided with a peripheral groove and protruding into said hub through an opening in said hub bottom portion, and a locking washer being fitted in said annular groove for axially securing said hub on said steering shaft end.

4. The vehicle steering wheel as set forth in claim 2, wherein said gas bag module is provided with a mounting flange which is clamped between said annular flange and said hub outer rim.

5. The vehicle steering wheel as set forth in claim 3, wherein said bush is surrounded by a radially spaced sleeve connected to said hub and defining an annular space for accommodation of at least one helically-wound contact spring.

6. A vehicle steering wheel with an integrated gas bag module, comprising a steering wheel body with an outer steering wheel rim, an inner annular flange, a plurality of spokes interconnecting said annular flange and said steering wheel rim, and a hub for securing to a steering shaft, said hub having an outer rim connected to said annular flange by fastening means, said gas bag module comprising a folded gas bag, a gas generator and a cover, said steering wheel rim and at least part of said spokes being encased in a continuous sheathing of plastics material with said cover forming an integral part of said sheathing, said gas bag module being accommodated in a space defined between said cover and a bottom portion of said hub, said fastening means being formed by a plurality of bolts passing through aligned openings in said annular flange and said hub outer rim, said gas bag module being provided with a mounting flange which is clamped between said annular flange and said hub outer rim.

7. The vehicle steering wheel as set forth in claim 1, wherein said hub has an internally splined bush fitting on an externally splined end of said steering shaft, said steering shaft having a free end provided with a peripheral groove and protruding into said hub through an opening in said hub bottom portion, and a locking washer being fitted in said annular groove for axially securing said hub on said steering shaft end.

8. The vehicle steering wheel as set forth in claim 7, wherein said bush is surrounded by a radially spaced sleeve connected to said hub and defining an annular space for accomodation of at least one helically-wound contact spring.

* * * * *